Patented Jan. 4, 1938

2,104,408

UNITED STATES PATENT OFFICE 2,104,408

LUBRICANT

Peter J. Wiezevich, Elizabeth, N. J., assignor to Standard Oil Development Company, a corporation of Delaware No Drawing. Application September 20, 1933, Serial No. 690,234

1 Claim. (Cl. 87—9)

The present invention relates to viscous ester lubricants and methods of producing same.

It has been discovered that certain synthetic high boiling esters can be used satisfactorily as lubricants capable of withstanding high temperature without carbonization and possessing good lubricating and viscosity characteristics, and also other relatively high boiling esters not possessing the desired vicosity can be thickened to the proper degree by the use of thickening agents as will be described below.

Esters which are suitable in themselves are those which have a vapor pressure of less than 5 mm. Hg at 150° C., a pour point less than 40° F. and a viscosity greater than about 40 seconds Saybolt at 210° F. Ethyl abietate is one example of such esters; this is made by esterifying rosin acids with ethyl alcohol.

One method included within the present invention for producing viscous ester lubricants is to react organic acids, especially aromatic dibasic acids such as phthalic acid, naphthoic acid, and the like, with alcohols having a long aliphatic radical; for instance, octadecyl alcohol and the alcohols obtained by hydrogenation of fatty acids produced by oxidation of paraffin wax, or by reduction of fats and fatty oils and the like. The viscous esters produced may either be used as such, or still further thickened by addition of suitable substances, especially the linear polymers of vinyl compounds or those produced by treating olefines such as isobutylene with boron fluoride at low temperature.

Another method of producing viscous ester lubricants is by alkylation of suitable esters which may be done by condensing, for instance, dibutyl phthalate with a material such as acetylene, chlorinated wax or other alkyl halides or cracked wax, etc. by means of the Friedel Craft reaction.

A still further method is to effect a polymerization of the ester. This may be accomplished in a number of ways such as by voltolization (treatment with high voltage silent electric discharge, say at 6,000 to 10,000 volts, 60-500 cycles, 5-20 mm. Hg vacuum, and 20-300° C.) or treatment with aluminum chloride, boron fluoride, etc. at −40 to 200° C. with or without the presence of solvents such as naphtha, ether, and the like, the time of reaction being from 10 minutes to periods of several days. For example, dibutyl phthalate voltolized at 10,000 volts, 60 cycles, 10 mm. Hg vacuum, and room temperature, increased in viscosity at 210° F. from 36 to 43 seconds.

Many esters possess certain characteristics which might make them desirable as lubricants, for instance, dibutyl phthalate has a pour point of −50° F., a flash of 310° F., a vapor pressure of 1.2 mm. Hg at 150° C. and a Conradson carbon value of .002%, but unfortunately its low viscosity has prevented any substantial use of this material as a lubricant. It has now been discovered that this particular ester, as well as a number of other types of esters, may be thickened in a number of different ways so as to obtain a finished product having the desired viscosity characteristics while still retaining the valuable properties of the original esters. For example, dibutyl phthalate may be thickened by the addition of a suitable amount, such as 5 or 10%, of polyvinyl acetate or from ½ to 4% or more of ethyl cellulose or with a somewhat larger amount (5 to 30% or so) of a polymerized vegetable oil such as thickened, or thickened and stabilized linseed oil. Addition of larger amounts produces thick grease-like products which are also suitable as lubricants.

It has already been proposed in the past to use cellulose acetate to thicken diethyl phthalate but no claim is made herein to that particular composition; in view of the fact that diethyl phthalate has a vapor pressure considerably above 5 mm. Hg at 150° C. it therefore is too volatile. When preparing esters from phthalic acid or phthalic anhydride according to the present invention, alcohols must be used which have 3 or more carbon atoms. With this type of ester any kind of a thickener may be used such as vinyl or cellulose esters or ethers, glyptal resins, glycol or glycerol phthalates, and other thickening agents mentioned hereinbelow.

Other esters which may be thickened in a similar manner include esters of aromatic acids and aliphatic alcohols, esters of organic hydroxy compounds and inorganic acids such as tri-o-cresyl phosphate, and also esters representing other combinations of basic and acidic groups such as aliphatic alcohols with aliphatic acids, aromatic bases with aliphatic acids and aromatic bases with aromatic acids. Esters of mono-, di-, or poly-hydric alcohols and of mono-, di-, or polybasic acids are included. For instance, straight chain aliphatic acids or the acids derived by oxidation of paraffin wax or other hydrocarbons, may be esterified by glycol or glycerine. The use of a dihydric alcohol, both alcohol radicals of which are primary, for this esterification, results in the production of esters which are stable to heat, due to lack of reactive secondary groups and they are consequently good lubricants and blending agents alone or in conjunction with some of the thickeners mentioned hereinbelow. One example of such a product is the di-ester formed from 2 mols of ricinoleic acid and ethylene glycol. Other examples of such esters suitable for this purpose are phenyl phosphate, triamyl citrate, butyl oleate, butyl stearate, n-propyl adipate, creosote carbonate, ethyl sebacate, benzyl benzoate, cyclohexyl oxalate, adipic acid dimethyl cyclohexyl ester, octadecenyl benzoate, o-benzoyl benzoic capryl ester, o-naphthoyl benzoic cyclohexyl ester, i-butoxymethyl benzoate, methylene butyrate, butyl tartrate, diacetin, methyl rexalin adipate, amyl phenyl acetate, amyl valerate, butyl lactate, dibutyl carbonate, ethyl dibenzyl malonate, dicresyl phthalate, ethyl cinnamate, benzyl borate, amyl stearate, triamyl borate, ethylene glycol monostearate, ethylene glycol monostearate mono-acetate, beta acetyl oxyethyl oxalate, ethylent glycol monobenzoate, and the like. Fatty oils such as vegetable, animal and fish oils are not within the scope of the present invention, as these are unsuitable because they contain considerable proportions of free acids, protein matter and other organic impurities, and contain a large number of different glyceride esters, some of which are suitable and some not. Mixtures of several esters may be used.

The thickened esters, prepared according to the present invention, possess improved viscosity at both 100° F. and 210° F. and in many cases possess a relatively high viscosity index (which represents the relation between the viscosity at 210° F. compared to the viscosity at 100° F.). They also possess high flash points, low pour points and relatively low Conradson carbon values.

The thickeners to be used according to the invention may be selected from a wide variety of sources. For instance, natural thickeners such as resins, rubber, solubilized silk, etc. may be used but a class of compounds which has been found to be particularly valuable as thickening agents is produced by the polymerization, with or without subsequent stabilization (such as by hydrogenation) of various vegetable, fish and animal oils, as well as certain types of organic compounds such as olefines, diolefines, esters, etc. Polyvinyl acetate and similar oxygenated linear polymers deserve special mention. Various synthetic resins may also be used such as phenolaldehyde resins, glycerol-phthalic anhydride resins, as well as resins derived from petroleum. Another thickener deserving particular mention is a product having the consistency of an extremely viscous liquid or a plastic solid which is produced by the polymerization of olefines, such as isobutylene, at low temperature, using boron fluoride as a catalyst. Polymerized styrene, indene, etc. or hydrogenated rubber may likewise be used. Mixtures of two or more thickeners may be used if desired. A polymer of such a type having a molecular weight range of 1,000 to 10,000 or even higher is especially adapted for this purpose.

The following table shows the physical properties of a large number of thickened esters which have been found especially suitable as lubricants:

| | Saybolt vis./100 | Saybolt vis./210 | Viscosity index | Flash °F. | Pour °F. | Conradson carbon percent |
|---|---|---|---|---|---|---|
| N-dibutyl phthalate | 57.5 | 34 | | 310 | −50 | .003 |
| Thickened with: | | | | | | |
| 5% polyvinyl acetate (Sample A) | 304 | 65 | 144 | | | |
| 10% polyvinyl acetate (Sample A) | 995 | 139 | 134 | 315 | −30 | 1.837 |
| 12.5% polyvinyl acetate (Sample B) | 2,709 | 310 | | | | |
| 20% polyvinyl acetate (Sample B) | 21,600 | 1,692 | 124 | | 15 | |
| 2.5% ethyl cellulose (medium viscosity) | 963 | 80 | 79 | | | |
| 4% ethyl cellulose (medium viscosity) | 7,967 | 288 | 89 | | | |
| 5% ethyl cellulose (high viscosity) | 7,596 | 276 | 89 | | 5 | |
| 5% benzyl cellulose | 609 | 68 | 92 | 330 | −20 | |
| 4% triethyl cellulose | 135 | 41 | 61 | 340 | −30 | |
| 5% nitro cellulose | 675 | 83 | 118 | | | |
| 30% thickened linseed oil (thickened 18 hours) | 864 | 178 | 143 | | | |
| 11.4% thickened linseed oil (thickened 20 hours) | 470 | 118 | 151 | | | |
| 2% resin from polymerized diolefines | 189 | 50 | 136 | | | |
| 4% rezyl resin | 65 | 35 | | | −35 | |
| 10% glycerol phthalate resin | 84 | 37 | | | | |
| 6% ethyl cellulose (high viscosity)+4% benzyl cellulose | Solid gel. | | | | | |
| Tri-o-cresyl phosphate | 132 | 39.4 | | 450 | −20 | .228 |
| Thickened with: | | | | | | |
| 10% bakelite resin | 360 | 49 | | | | |
| 10% rezyl resin | 237 | 45 | | 465 | −10 | |
| 2% ethyl cellulose | 1,520 | 103 | | | −5 | |
| 10% glycerol phthalate resin | 240 | 45 | | | | |
| Triethyl citrate | | | | | | |
| Thickened with: | | | | | | |
| 10% bakelite resin | 136 | 38 | | 305 | −30 | |
| Ethyl oleate | 46 | 32 | | 295 | 10 | .188 |
| Thickened with: | | | | | | |
| 5% polymerized isobutylene | 225 | 77 | 166 | 325 | 10 | |
| 10% polymerized isobutylene | 1,035 | 340 | 138 | 340 | 10 | .067 |
| Ethyl abietate | 1,011 | 60 | | 350 | 15 | .015 |
| Thickened with: | | | | | | |
| 4% polymerized isobutylene | 5,522 | 246 | 96 | | 15 | .039 |
| 3% ethyl cellulose (medium viscosity) | 12,375 | 266 | 44 | | 20 | |
| 10% thickened linseed oil (thickened 18 hours) | 3,900 | 143 | 46 | | 15 | .310 |
| N-amyl phthalate | 69 | 35 | | 280 | −35 | .006 |
| Thickened with: | | | | | | |
| 10% polyvinyl acetate (Sample A) | 1,769 | 110 | 79 | 345 | −30 | .773 |
| 4% ethyl cellulose (medium viscosity) | 2,328 | 155 | 102 | | 0 | .360 |
| N-butyl stearate | 49 | 34 | | 335 | 65 | .007 |
| Thickened with: | | | | | | |
| 5% polymerized isobutylene | 298 | 95 | 160 | 330 | 65 | .027 |

As may be observed from the above table, the percentage of thickening agent to be added may vary over a wide range, say from 1–30% or more, depending upon the properties of the thickening agent and the ester being thickened as well as the desired properties of the compounded lubricant. All thickeners are not equally soluble in all types of esters; in fact, some thickeners are insoluble in some esters, but within the scope of the invention thickeners can always be selected which are soluble in the desired esters, or esters can be selected which will be suitable for use with any desired thickener. Without attempting to discuss all the ramifications concerning solubility or insolubility of the various esters and thickeners, a few observations will be briefly mentioned to serve as a guide for those skilled in the art. The plastic polymer obtained by polymerizing isobutylene at low temperature with boron fluoride is soluble in ethyl oleate, butyl stearate, and ethyl abietate, but contrary to expectations it is not soluble in isopropyl esters of the fatty acids produced by the oxidation of paraffin wax. Neither is it soluble to any substantial extent in triethyl citrate, tri-o-cresyl phosphate, the phthalates or propyl adipate. On the other hand, polyvinyl acetate is soluble in the phthalates and propyl adipate, but not soluble in ethyl abietate and ethyl oleate. Ethyl cellulose dissolves in the phthalates, ethyl abietate and tri-o-cresyl phosphate. In case the thickener is not soluble in the desired ester base, a solubilizer or mutual solvent may be added such as mineral oil, white oil, high boiling alcohol, ketone, ether, or other high boiling solvent as, for example, dimethyl naphthalene, methyl naphthalene and diphenyl oxide or esters other than that being used as base. Following are two examples of insoluble thickeners solubilized in ester:

|  | A | B |
|---|---|---|
| Ester | 59% isopropyl esters of oxidized wax acids. | 50% ethyl oleate. |
| Thickener | 1% isobutylene polymer. | 4% polyvinyl acetate. |
| Solubilizer | 40% white oil. | 46% dibutyl phthalate. |

The viscous ester lubricants described hereinabove may be used as such or in conjunction with mineral or fatty lubricating oils or with other materials such as aromatic compounds including, for instance, chlorinated naphthalene, diphenyl, diphenyl oxide, diphenylene oxide, alkylated naphthalenes, polynaphthalenes, etc. For making blends with the usual lubricating oils, those derived from various types of crude oils may be used depending to some extent upon the type of esters and thickeners being blended therewith. At room temperatures, dibutyl phthalate is not miscible with Pennsylvania or white oils but on the other hand it is compatible with Coastal oils. Polyvinyl acetate is soluble to a small extent in Coastal oils. Other esters such as ethyl oleate, butyl stearate, etc. are soluble in Pennsylvania oils.

A suitable blend with a lubricating oil is illustrated as follows:

| | Per cent |
|---|---|
| Coastal mineral oil | 80 |
| Dibutyl phthalate | 15 |
| Polyvinyl acetate | 5 |
| | 100 |

The viscous ester lubricants prepared according to the present invention may also be used in combination with various basic materials such as amines, onium bases and the like, and it is likewise possible to manufacture greases by the incorporation of suitable soap ingredients with these viscous ester lubricants. Other materials such as pour inhibitors, oxidation inhibitors such as alpha naphthol, naphthaquinone, and the like, dyes, load carrying agents such as sulfur compounds and lead soaps, sludge dispersing agents, etc. may be added.

Although a large number of examples have been given, it is not intended that the invention be limited thereto inasmuch as it is conceivable that a considerable number of variations may be made without departing from the broader principles of the invention. It is therefore intended in the appended claim to claim all novelty inherent in the invention as broadly as the prior art permits.

I claim:

A lubricant comprising a major proportion of a mineral lubricating oil, dibutyl phthalate and a polyvinyl acetate.

PETER J. WIEZEVICH.